US012708881B2

(12) United States Patent
Davenport et al.

(10) Patent No.: US 12,708,881 B2
(45) Date of Patent: Aug. 18, 2026

(54) THIN-FILM COMPOSITE MEMBRANES SYNTHESIZED BY MULTI-STEP COATING METHODS

(71) Applicant: KATHOLIEKE UNIVERSITEIT LEUVEN, Leuven (BE)

(72) Inventors: Douglas Davenport, Sint-Lambrechts-Woluwe (BE); Ivo Vankelecom, Oud-Heverlee (BE); Rhea Verbeke, Hoeilaart (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 939 days.

(21) Appl. No.: 17/921,476

(22) PCT Filed: Apr. 28, 2021

(86) PCT No.: PCT/EP2021/061075
§ 371 (c)(1),
(2) Date: Oct. 26, 2022

(87) PCT Pub. No.: WO2021/219692
PCT Pub. Date: Nov. 4, 2021

(65) Prior Publication Data

US 2023/0182087 A1 Jun. 15, 2023

(30) Foreign Application Priority Data

Apr. 28, 2020 (EP) .................................... 20171874

(51) Int. Cl.

| | |
|---|---|
| ***B01D 61/02*** | (2006.01) |
| ***B01D 61/14*** | (2006.01) |
| ***B01D 67/00*** | (2006.01) |
| ***B01D 69/02*** | (2006.01) |
| ***B01D 69/12*** | (2006.01) |
| ***B01D 71/52*** | (2006.01) |
| ***B01D 71/56*** | (2006.01) |
| ***C02F 1/44*** | (2023.01) |
| *C02F 101/12* | (2006.01) |

(52) U.S. Cl.
CPC ....... *B01D 69/1251* (2022.08); *B01D 61/025* (2013.01); *B01D 61/027* (2013.01); *B01D 61/145* (2013.01); *B01D 67/0006* (2013.01); *B01D 69/02* (2013.01); *B01D 69/1214* (2022.08); *B01D 71/5222* (2022.08); *B01D 71/5223* (2022.08); *B01D 71/56* (2013.01); *C02F 1/441* (2013.01); *C02F 1/442* (2013.01); *C02F 1/444* (2013.01); *B01D 2325/30* (2013.01); *C02F 2101/12* (2013.01)

(58) Field of Classification Search
CPC ............ B01D 69/1251; B01D 71/5222; B01D 71/5223; B01D 2325/30
See application file for complete search history.

(56) References Cited

U.S. PATENT DOCUMENTS

| | | | |
|---|---|---|---|
| 2017/0065937 | A1 | 3/2017 | Dom et al. |
| 2018/0326362 | A1 | 11/2018 | Niu et al. |

FOREIGN PATENT DOCUMENTS

| | | | |
|---|---|---|---|
| CN | 1468649 | A | 1/2004 |
| CN | 107469650 | A | 12/2017 |
| CN | 108452689 | A | 8/2018 |
| WO | 2018220209 | A1 | 12/2018 |

OTHER PUBLICATIONS

Ku, Ji-Yong et al.—CN 1468649 A machine translation—Jan. 21, 2004 (Year: 2004).*
Wu, Dihua, et al. "Thin film composite nanofiltration membranes assembled layer-by-layer via interfacial polymerization from polyethylenimine and trimesoyl chloride." Journal of Membrane Science 472 (2014): 141-153. (Year: 2014).*
International Search Report in reference to co-pending European Application No. PCT/EP2021/061075 filed Apr. 28, 2021.
Written Opinion in reference to co-pending European Application No. PCT/EP2021/061075 filed Apr. 28, 2021.
Baker, et al., "Membrane Technology and Applications", Membrane Tech. and Research, Inc., Second Edition, pp. 1-545, 2004.
Chen, et al., "Fabrication and characterization of nanocapsules containing n-dodecanol by miniemulsion polymerization usuing interfacial redox initiation", Colloid Polym Sci., vol. 209, pp. 307-314, 2012.
Ellen, "Epoxy-based membranes for solvent resistant nanofiltration", Feb. 28, 2017, XP055718536.
Ellen, "Epoxy-based membranes for solvent resistant nanofiltration", Feb. 21, 2017, XP055718719.
Imai, et al., "Importance of Polymerization Initiator Systems and Interfacial Initiation of Polymerization in Adhesive Bonding of Resin to Dentin", vol. 70, No. 7, pp. 1088-1091, Jul. 1991.

(Continued)

*Primary Examiner* — Bradley R Spies
(74) *Attorney, Agent, or Firm* — DINSMORE & SHOHL LLP

(57) ABSTRACT

The invention relates to methods for the synthesis of a thin-film composite membrane, comprising the following steps: a) providing an ultrafiltration porous support membrane, coated at the outer surface with a thin film, synthesized through interfacial polymerisation or interfacial initiation of polymerisation, b) contacting the membrane with a first solution comprising a first monomer, and allowing the solution to impregnate inside the thin film of the membrane, c) discarding the first solution comprising the first monomer, d) contacting the membrane with a second solution comprising a second monomer, and allowing the solution to impregnate inside the thin film of membrane, whereby the second monomer reacts with the first monomer and optionally with reactive groups of the thin film, e) discarding the second solution comprising the second monomer.

16 Claims, 3 Drawing Sheets

(56) References Cited

OTHER PUBLICATIONS

Koops, et al., "Selectivity as a Function of Membrane Thickness: Gas Separation and Pervaportion", Industrial Products Research Institute, pp. 1639-1652, 1994.

Mariën, et al., "Sustainable Process for the Preparation of High-Performance Thin-Film Composite Membranes using Ionic Liquids as the Reaction Medium", ChemPubSoc, vol. 9, pp. 1101-1111, 2016.

Alberti, et al., Properties of Polyvinylidene Fluoride Membranes at Low Degrees of Sulphonation and their Characteriztion by Concentration Potential Coupled with A.C. Impedance Measurements, Journal of Membrane Science, vol. 16, pp. 121-135, 1983.

Petersen, "Composite reverse osmosis and nanofiltration membranes", Journal of Membrane Science, vol. 83, pp. 81-150, 1993.

Verbeke, et al., "Transferrring bulk chemistry to interfacial synthesis of TFC-membranes to create chemically robust poly(epoxyether) films", Journal of Membrane Science, vol. 582, pp. 442-453, 2019.

Verbeke, et al., "The significant role of support layer solvent annealing in interfacial polymerization: The case of epoxide-based membranes", Journal of Membrane Science, vol. 612, pp. 1-8, 2020.

Wang, et al., "A polyamide-silica composite prepared by the soi-gel process", vol. 31, pp. 323-330, 1993.

Wei, et al., "Novel cationic pH-responsive poly(N,N-dimethylaminoethyl methacrylate) microcapsules prepared by a microfluidic technique", Journal of Colloid and Interface Science, vol. 357, pp. 101-108, 2011.

* cited by examiner

THIN-FILM COMPOSITE MEMBRANES SYNTHESIZED BY MULTI-STEP COATING METHODS

CROSS REFERENCES TO RELATED APPLICATIONS

This application is a national-stage application under 35 U.S.C. § 371 of International Application No. PCT/EP2021/061075, filed Apr. 28, 2021, which International Application claims benefit of priority to European Patent Application No. 20171874.9, filed Apr. 28, 2020.

FIELD OF THE INVENTION

The invention relates to thin film composite membranes which are prepared by multi-step coating methods. The membranes are suitable for ultrafiltration in harsh physical conditions.

BACKGROUND OF THE INVENTION

Membrane separation technology has gained an important place in the chemical industry. It can be applied in the separation of a range of components of varying molecular weights in gas or liquid phases, including but not limited to nanofiltration, desalination and water treatment. It has several advantages to offer compared to the traditional separation processes, such as distillation, adsorption, absorption or solvent extraction. The benefits include continuous operation, lower energy consumption, possibility of integration with other separation processes, mild conditions and thus more environment friendly, easy but linear up-scaling, feasibility of making tailor-made membranes and less requirement of additives (Basic Principles of Membrane Technology, Second Edition, M. Mulder, Kluwer Academic Press, Dordrecht. 564p).

In membrane separations, the aim is to retain one (or more) component(s) of a mixture, while other components can freely permeate through the membrane under a driving force that can be a pressure, concentration or potential gradient. Membranes are used in many applications, for example as inorganic semiconductors, biosensors, heparinized surfaces, facilitated transport membranes utilizing crown ethers and other carriers, targeted drug delivery systems including membrane-bound antigens, catalyst containing membranes, treated surfaces, sharpened resolution chromatographic packing materials, narrow band optical absorbers, and in various water treatments which involve removal of a solute or contaminant for example dialysis, electrolysis, microfiltration, ultrafiltration and reverse osmosis.

Although membrane separation processes are widely applied in the filtration of mild aqueous fluids, they have not been (widely) used under highly challenging pH or oxidizing conditions, neither for the separation of solutes in organic solvents. Their relatively poor performance and/or stability in these conditions decreases their applicability in more aggressive feeds, despite an enormous potential economical market. For example, chemical and pharmaceutical syntheses or textile dyeing are frequently performed in organic solvents containing products with high added value, like acids and bases or catalysts, which would be recoverable via membrane technology. The recovery of metal salts from acid mine leachates, treatment of harsh waste streams from chemical and pharmaceutical industries and purification of chlorinated water streams in desalination are other examples in which ultra-stable membranes could serve purpose.

Many membranes for aqueous applications are thin film composite (TFC) membranes made by interfacial polymerization (IFP). The IFP technique is well known (Petersen (1993) *J. Membr. Sci* 83, 81-150) and several procedures (e.g. U.S. Pat. Nos. 3,744,642, 4,277,244, 4,950,404) are illustrative of the fundamental method for preparing TFC membranes. One of the earliest patents to describe membranes of the type used in the present invention, U.S. Pat. No. 3,744,642 discloses the process of reacting a broad group of aliphatic or carbocyclic primary diamines with aliphatic or carbocyclic diacyl halides on a porous support membrane to form TFC membranes.

In IFP, an aqueous solution of a reactive monomer (often a polyamine (e.g. a diamine)) is first deposited in the pores of a porous support membrane (e.g. a polysulfone ultrafiltration membrane)—this step is also referred to as support membrane impregnation. Then, the porous support membrane, loaded with the first monomer, is immersed in a water-immiscible (organic) solvent solution containing a second reactive monomer (e.g. a tri- or diacid chloride). The two monomers react at the interface of the two immiscible solvents, until a thin film presents a diffusion barrier and the reaction is completed to form a highly cross-linked thin film layer that remains attached to the support membrane. Since membranes synthesized via this technique usually have a very thin top layer, high solvent permeances are expected. High flux is often associated with thin membranes, while high selectivity should not be affected by membrane thickness (Koops et al. (1994) *J. Appl. Pol. Sci.* 53, 1639-1651). Since the first successes reached within this field by Loeb and Sourirajan, extensive research has been performed starting from their reverse osmosis membranes disclosed in U.S. Pat. No. 3,133,132. A subsequent breakthrough was achieved by Cadotte. Inspired by the work of Morgan, who was the first to describe "interfacial polymerization", Cadotte produced extremely thin films using the knowledge about interfacial polymerization, as disclosed in U.S. Pat. No. 4,277,344.

The thin film layer can be from several tens of nanometres to a few micrometres thick. The thin film is selective between molecules, and this selective layer can be optimized for solute rejection and solvent flux by controlling the coating conditions, the characteristics and concentrations of the reactive monomers, the choice of the support membrane or the use of additives (e.g. acid-acceptors, surfactants . . . ). The (micro-)porous support can be selectively chosen for porosity, strength and solvent resistance. There is a myriad of supports or substrates for membranes. Specific physical and chemical characteristics to be considered when selecting a suitable substrate include: porosity, surface porosity, pore size distribution of surface and bulk, permeability, solvent resistance, hydrophilicity, flexibility and mechanical integrity. Pore size distribution and overall surface porosity of the surface pores are of great importance when preparing a support for IFP.

An example of interfacial polymerization used to prepare TFC membranes are "Nylons", which belong to a class of polymers referred to as polyamides. One such polyamide is made, for example, by reacting a triacyl chloride, such as trimesoylchloride, with a diamine, such as m-phenylenediamine. The reaction can be carried out at an interface by dissolving the diamine in water and bringing a hexane solution of the triacyl chloride on top of the water phase. The diamine reacts with the triacyl chloride at the interface between these two immiscible solvents, forming a polyamide film at or near the interface which is less permeable to the reactants. Thus, once the film forms, the reaction slows down drastically, leaving a very thin film. In fact, if the film is removed from the interface by mechanical means, fresh film forms almost instantly at the interface, because the reactants are so highly reactive.

Among the products of interfacial polymerization are polyamides, polyureas, polyurethanes, polysulfonamides, polyesters (U.S. Pat. No. 4,917,800), polyacrylates, or β-alkanolamines (US20170065937). Factors affecting the making of continuous, thin interfacial films include temperature, the nature of the solvents and co-solvents (including ionic liquids: Mariën et al. (2016) *ChemSusChem* 9, 1101-1111), and the concentration and the reactivity of monomers and additives. These polymers however have various disadvantages. Next to poor stability in for instance chlorinated and oxidizing solvents, the most-widely used polyamides fail to sustain at temperatures higher than 45° C. and outside a pH range of 2-12 (Wang et al. (1993) *Polymer Bulletin* 31, 323-330). The drawbacks of this traditional IFP product has led to the demand of new, solvent stable membranes with similar performance.

Novel membranes are also needed since there is an interest in operating in organic solvent streams to separate small molecules such as synthetic antibiotics and peptides from organic solutions. In these types of applications, a high permeability is required for economical operation. Polar organic solvents, such as dipolar aprotic solvents, particularly solvents such as N-methyl pyrrolidone (NMP), dimethylacetamide (DMAC), dimethyl formamide (DMF) and dimethylsulfoxide (DMSO) are used as solvents or media for chemical reactions to make pharmaceuticals and agrochemicals (for example, pyrethroid insecticides). These demanding solvents will cause severe damage to commonly used polymeric membranes made from polysulfone, polyethersulfone, polyacrylonitrile or polyvinylidene fluoride polymers. TFC membranes based on a β-alkanolamine top layer could overcome some of these challenges and has proven stable in DMF and in extreme acidic conditions (US20170065937), however these TFC membranes are still not stable in several harsh conditions, such as aqueous oxidizing conditions (eg. NaOCl and NaOH).

Other types of polymerization, such as polymerization by interfacial initiation (IFIP) are described in other scientific fields, not related to membrane technology. Here, the reaction can solely begin when a nucleophilic compound (the so-called initiator) is present at the interface, allowing a localized polymerization. This concept has been described in other fields of science such as in microfluidics and encapsulation technologies (Wei et al. (2011) *J. Coll. Int. Sci.* 357, 101-108; Chen et al. (2012) *Coll. Pol. Sci.* 290, 307-314), and in the resin industry (Imai et al. (1991) *J. Dental Res.* 70, 1088-1091) but have—up to now—not yet been applied for membranes with purification or separation purposes. Moreover, there is also not any suggestion in these other scientific fields to use IFIP in the field of membrane technology, let alone to use IFIP to generate membranes with improved properties.

In many applications, it would also be useful for the membrane to operate with aqueous mixtures of solvents or with both aqueous solutions and solvent based solutions in series. For such uses, hydrophobic membranes are not useful as they have very low permeabilities for aqueous solutions.

These different requirements have led to a pressing demand of new, broad solvent-stable, oxidation- and pH-resistant membranes. It is an objective of the present invention to provide a highly efficient novel route for the production of such membranes and to obtain TFC membranes with salt rejection and high stability in highly challenging conditions.

SUMMARY OF THE INVENTION

The present invention relates to a method for the preparation of thin-film composite (TFC) membranes by multistep coating methods and the TFC membranes produced by this method. More particularly, the method of the present invention relates to the use of a ring-opening polymerization reaction of epoxide monomers for making multiple polymer coatings on a porous support membrane. The resulting poly(epoxy)ether TFC membranes are stable in various challenging conditions of extreme pH, in harsh oxidizing environments and in highly demanding aprotic solvents, while maintaining rejection of mono- and divalent salts.

The present invention provides a method for the preparation of thin film composite (TFC) membranes by interfacial initiation of polymerization (IFIP) and the TFC membranes produced by this method. More particularly, the present invention provides an IFIP method using a ring-opening polymerization reaction of epoxide monomers for making a thin film polymer coating on a porous support membrane. By subsequently and alternatingly re-applying the initiator and monomer phase on top of the formed membrane, the thin top-layer is densified, resulting in increased salt rejections. The poly(epoxy)ether TFC membranes generated by this method are stable in various challenging conditions of extreme pH, in harsh oxidizing environments and in highly demanding aprotic solvents, while maintaining rejection of small solutes and ions.

The present invention more particularly provides poly (epoxy)ether TFC membranes with improved stability in a broad range of pH and chemicals, for use in (nano)filtration of components in aggressive aqueous and organic solvents, such as polar aprotic solvents or chlorinated aqueous feeds.

The repetitive polymerisation process has the advantages that a thin film is formed with small pores, whereby the pore size can be monitored between each step.

Conventional prolonged one step methods allow little control on the pore size while thick membranes will be obtained.

Numbered statements of this invention are:

1. A method for the synthesis of a thin-film composite membrane, comprising the following steps:
 a) providing an ultrafiltration porous support membrane, coated at the outer surface with a thin film, synthesized through interfacial polymerisation or interfacial initiation of polymerisation,
 b) contacting the membrane with a first solution comprising a first monomer, and allowing the solution to impregnate inside the thin film of the membrane, whereby optionally the first monomer reacts with functional groups of the thin film,
 c) discarding the first solution comprising the first monomer,
 d) contacting the membrane with a second solution comprising a second monomer, and allowing the solution to impregnate inside the thin film of membrane, whereby the second monomer reacts with the first monomer and optionally with reactive groups of the thin film,
 e) discarding the second solution comprising the second monomer.

2. The method according to statement 1, wherein steps b) to e) are repeated, for example two or three times.
3. The method according to statement 1 or 2, wherein steps b) to e) are repeated, and wherein the monomer order has been switched or wherein other monomers have been used.
4. The method according to any one of statements 1 to 3, wherein steps b) to e) are repeated, and wherein the first monomer and the second monomer are in each cycle of steps b) to e) identical.
5. The method according to any one of statements 1 to 3, wherein steps b) to e) are repeated, and wherein, if in a cycle of steps b) to e) the first solution comprises a first monomer and the second solution comprises a second monomer, then in the consecutive cycle, the first solution comprises the second monomer and the second solution comprises the first monomer.
6. The method of any one of statements 1 to 5, wherein a monomer contains a functional group selected from the group consisting of an acid halide, a di-, tri-, or polyamine, an isocyanate, a polyol, a mono-, or dicarboxylic acid and a functionalized triazines.
7. The method of any one of statements 1 to 5, wherein a monomer contains a functional group selected from the group consisting of a tertiary amino, a tertiary thiol, a base and a hydroxyl group.
8. The method according to any one of statements 1 to 6, wherein the first monomer is a nucleophilic monomer, and wherein the second monomer is polyfunctional epoxide monomer.
9. The method according to statement 7, wherein the second solution is a solvent or ionic liquid that is immiscible with the first solution.
10. A method for synthesis of a thin-film composite membrane comprising a poly(epoxy)ether top layer by interfacial initiation of polymerization (IFIP), comprising the following steps:
a) providing an ultrafiltration porous support membrane, coated at the outer surface with a thin film, wherein the thin film comprises a first solution comprising a nucleophilic monomer,
b) contacting the thin film of the impregnated support membrane with a second solution which is a solvent or ionic liquid that is immiscible with the first solution used in a) and comprises a polyfunctional epoxide monomer, thereby allowing a reaction of the nucleophilic monomer and the polyfunctional epoxide monomer. The reaction takes places within the pores of the thin film. In addition polymer formation on top of the thin film may equally occur.
11. The method according to statement 10, wherein the thin film in step a) is a poly(epoxy)ether thin film.
12. The method of statement 10 or 11, further comprising:
step c) of contacting after step b) the membrane top-layer with a solvent containing a polyfunctional epoxide monomer,
and
step d) of contacting the membrane top-layer with a solvent containing a polyfunctional nucleophilic monomer (monomer 4) thereby allowing a reaction of the nucleophilic monomer and the polyfunctional epoxide monomer at the interface of the first solution and the second solution. Herein solvents of subsequent steps may be miscible.
13. The method of any one of statements 10 to 12, wherein the nucleophilic compound contains a functional group selected from the group consisting of a tertiary amino, a tertiary thiol, a base and a hydroxyl group.
14. The method of any one of statements 10 to 13, wherein the nucleophilic compound contains a functional group selected from the group consisting of acid halides, di-, tri-, or polyamines, isocyanates, polyols, mono-, or dicarboxylic acids and functionalized triazines
15. The method of any one of statements 10 to 14, wherein the epoxide monomer is selected from the group consisting a phenyl glycidyl ether, bisphenol-A-diglycidyl-ether, tetraphenolethane tetraglycidylether, neopentylglycol diglycidylether, trimetylolpropane triglycidylether, 1,4-butanediol diglycidylether, triglycidyl-p-aminophenol, tetraglycidyl-4,4'-diaminodiphenylmethane, and diglycidyl ester of hexahydrophthalic acid.
16. The method according to any one of statements 1 to 15, wherein the porous support membrane has thickness of between 0.1 and 500 μm.
17. The method according to any one of statements 1 to 16, where the method is performed until a top layer is obtained with a thickness <100 μm and pores below 15 nm.
18. The use of a thin film composite membrane obtained by the method according to any one of the statements 1 to 17, for nanofiltration or reverse osmosis of components.
19. The use according to statement 18, wherein said components are suspended in organic solvents or a combination of organic solvents and water.
20. The use according to statement 18 or 19, wherein said components are suspended in aqueous solvents of extreme pH, such as pH 0 to pH 4), or pH 10 to pH 14.
21. The use according to any one of statements 18 to 20, wherein said components are suspended in aqueous oxidizing solvents, such as NaOCl.
22. The use according to any one of statements 19 to 23, wherein said components are suspended in polar aprotic solvents.
23. A thin-film composite membrane comprising a poly (epoxy)ether top layer obtainable by the method according to any one of statements 1 to 18.
24. A method for the synthesis of a thin-film composite membrane, comprising the steps of:
a) providing an ultrafiltration porous support membrane, coated at the outer surface with a thin film, the thin film being synthesized through interfacial polymerisation or interfacial initiation of polymerisation,
b) contacting the membrane with a first solution comprising a first monomer capable of reacting with a second monomer, and allowing the solution to impregnate inside the thin film of the membrane,
c) discarding the first solution comprising the first monomer,
d) contacting the membrane with a second solution comprising said second monomer and allowing the second solution to impregnate inside the thin film of the membrane, whereby the second monomer reacts with the first monomer and optionally with reactive groups of the thin film, thereby obtaining polymerisation within the thin film,
e) discarding the second solution comprising the second monomer,
f) determining the solute flux of the membrane obtained in step e) and selecting a membrane wherein the solute flux of the membrane obtained is step e) is at least 5% lower, or at least 10% lower, or at least 20% lower, or at least 40% lower compared to the solute flux of the membrane provided in step a).

25. The method according to statement 24, wherein the first solution in step b) and/or the second solution in step d) allows swelling of the thin film.
26. The method according to statement 24 or 25, wherein steps b) to e) are repeated, for example two or three times.
27. The method according to any one of statements 24 to 26, wherein steps b) to e) are repeated, and wherein the monomer order has been switched or wherein monomers other than said first and second monomer, and capable of reacting with each other, are used.
28. The method according to any one of statements 24 to 27, wherein steps b) to e) are repeated, and wherein the first monomer and the second monomer are in each cycle of steps b) to e) identical.
29. The method according to any one of statements 24 to 28, wherein steps b) to e) are repeated, and wherein, if in a cycle of steps b) to e) the first solution comprises a first monomer and the second solution comprises a second monomer, then in the consecutive cycle, the first solution comprises said second monomer and the second solution comprises said first monomer.
30. The method according to any one of statements 24 to 29, wherein a monomer contains a functional group selected from the group consisting of an acid halide, a di-, tri-, or polyamine, an isocyanate, a polyol, a mono-, or dicarboxylic acid and a functionalized triazine.
31. The method according to any one of statements 24 to 30, wherein a monomer contains a functional group selected from the group consisting of a tertiary amino, a tertiary thiol, a base and a hydroxyl group.
32. The method according to any one of statements 24 to 31,
    wherein the first monomer is a nucleophilic monomer, and
    wherein the second monomer is polyfunctional epoxide monomer.
33. The method according to any one of statements 24 to 32, wherein the second solution is a solvent or ionic liquid that is immiscible with the first solution.
34. The method according to statement 32, wherein the epoxide monomer is selected from the group consisting a phenyl glycidyl ether, bisphenol-A-diglycidyl-ether, tetraphenolethane tetraglycidylether, neopentylglycol diglycidylether, trimetylolpropane triglycidylether, 1,4-butanediol diglycidylether, triglycidyl-p-aminophenol, tetraglycidyl-4,4'-diaminodiphenylmethane, and diglycidyl ester of hexahydrophthalic acid.
35. The use of a thin film composite membrane obtained by the method according to any one of the statements 24 to 34, for nanofiltration or reverse osmosis of components.
36. The use according to statement 35, wherein said components are suspended in organic solvents or a combination of organic solvents and water, or wherein said components are suspended in polar aprotic solvents.
37. The use according to statement 35 or 36, wherein said components are suspended in aqueous solvents of pH 0-4 or pH 10-14.
38. The use according to any one of statements 35 to 37, wherein said components are suspended in an aqueous solution comprising a compound selected from the group consisting of NaOCl, Ca(OCl)2 and H2O2.

DETAILED DESCRIPTION

Figure 1:
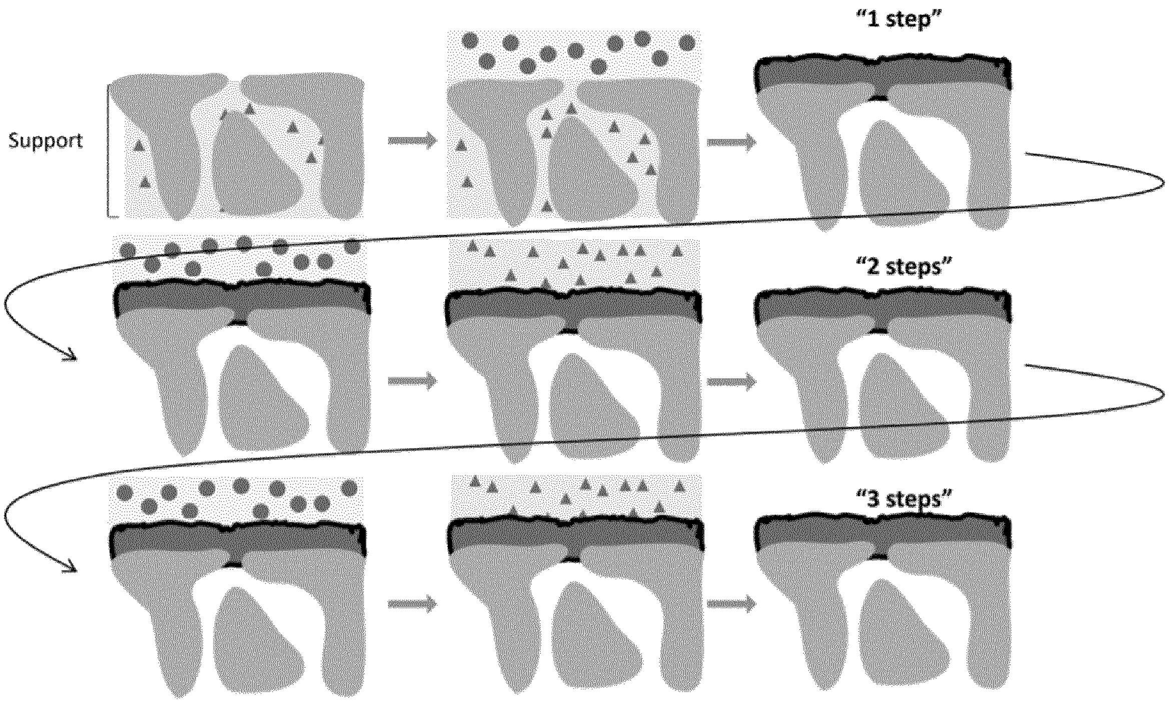
FIG. 1: Schematic of the IFIP procedure and subsequent coating steps, using an exemplary epoxide monomer (EPON 1031™) and initiator (tetramethyl hexane diamine).

The present invention relates to a new method for preparation of thin film composite membranes (TFC) by interfacial initiation polymerization (IFIP) and TFC membranes produced by this method. More particularly, the present invention provides an IFIP method comprising an initiator-induced ring-opening polymerization reaction of epoxide monomers for making an adhesive polymer of a poly(epoxy) ether on a porous support membrane. By subsequently and alternatingly re-applying the monomer and initiator, the membrane density and charge can be tuned, providing novel TFC membranes.

The scope of the applicability of the present invention will become apparent from the detailed description and drawings provided below. However, it should be understood that the detailed description and specific examples, while indicating preferred embodiments of the present invention, are given by way of illustration only since various changes and modifications are also within the spirit and scope of the invention as apparent from this detailed description. Unless otherwise defined, all technical and scientific terms used herein have the same meaning as commonly understood by one of ordinary skill in the art to which this invention belongs.

One aspect of the present invention provides a method for preparation of TFC membranes comprising a thin film layer, preferably a poly(epoxy)ether polymer, formed by IFIP involving a ring-opening polymerization reaction of epoxide monomers with an initiator.

The method of the present invention optionally involves the addition of nanoparticles, phase-transfer catalysts or surfactants to reduce surface tension effects, inorganic salts, co-solvents or a combination thereof. The temperature and time of contacting can vary, depending on the kind of support and the kind and concentration of the reactants, but contacting is generally carried out from about 1 min to 100 hours at room temperature or 70° C.

The method of the present invention optionally involves that the TFC membrane may be washed to remove unreacted monomers, chemically treated with acids, bases, or other reagents to modify performance characteristics, treated with a humectant or protective coating and/or dried, stored in water until tested, further treated for environmental resistance, or otherwise used. Such post-treatments are well-known in the art (U.S. Pat. Nos. 5,234,598; 5,085,777; 5,051,178).

One embodiment of the present invention provides the preparation of TFC membranes, preferably a TFC membrane comprising a poly(epoxy)ether polymer, by interfacial initiation, comprising the following steps:

(a) impregnating a porous support membrane, optionally comprising a first conditioning agent, with a polyfunctional initiator solution comprising:
(i) an aqueous first solvent for said initiator; (ii) said initiator; (iii) optionally, an activating solvent; and (iv) optionally, additives including bases, alcohols, ketones, ethers, esters, halogenated hydrocarbons, nitrogen-containing compounds and sulphur-containing compounds, monohydric aromatic compounds; wherein said support membrane is stable in polar aprotic solvents;
(b) contacting the impregnated porous support membrane with a polyfunctional epoxide monomer solution comprising:
(i) a substantially water-immiscible second solvent for the polyfunctional epoxide monomer; (ii) a polyfunctional epoxide monomer; (iii) optionally, an activating solvent; and (iv) optionally, additives including alcohols, ketones, ethers, esters, halogenated hydrocarbons, nitrogen-containing compounds and sulphur-containing compounds, monohydric aromatic compounds;
wherein the aqueous first solvent ((a)(i)) and the immiscible second solvent ((b)(i)) form a two phase system;
(c) optionally, re-contacting the membrane top-layer with a second substantially water-immiscible solvent containing a polyfunctional epoxide monomer solution comprising:
(i) a substantially water-immiscible second solvent for the polyfunctional epoxide monomer; (ii) a polyfunctional epoxide monomer; (iii) optionally, an activating solvent; and (iv) optionally, additives including alcohols, ketones, ethers, esters, halogenated hydrocarbons, nitrogen-containing compounds and sulphur-containing compounds, monohydric aromatic compounds;
wherein the aqueous first solvent ((a)(i)) and the immiscible second solvent ((b)(i)) form a two phase system;
(d) optionally, re-contacting the membrane top-layer with a polyfunctional initiator solution comprising:
(i) an aqueous first solvent for said initiator; (ii) said initiator; (iii) optionally, an activating solvent; and (iv) optionally, additives including bases, alcohols, ketones, ethers, esters, halogenated hydrocarbons, nitrogen-containing compounds, sulphur-containing compounds, phosphor-containing compounds, monohydric aromatic compounds; wherein said support membrane is stable in polar aprotic solvents;
(e) optionally, repeating steps (c) and (d)
(f) optionally, treating the resulting composite membrane with an activating solvent; and,
(g) optionally, impregnating the resulting composite membrane with a second conditioning agent.

The synthesis of a polymeric membrane based on the reaction of an epoxide-compound with an amine-compound have been described in the literature (WO2010099387, U.S. Pat. No. 4,265,745, CN104190265A). However, these systems differ from the present invention in that they are either not biphasic, do not contain an initiator, are not based on an interfacial polymerization reaction, do not comprise multiple synthesis steps or need a cross-linker agent to become selective. Additionally, the sequence in which the monomer and initiator are applied is important as to obtain a salt-selective membrane.

Membrane Casting

A porous support membrane for use in the method according to the present invention can be prepared as follows: a polymer solution is casted onto a suitable porous substrate, from which it then may be removed. Casting of the membrane may be performed by any number of casting procedures cited in the literature, for example U.S. Pat. Nos. 3,556,305, 3,567,810, 3,615,024, 4,029,582, 4,188,354 and GB2000720. The present invention relates to a method for the preparation of thin-film composite (TFC) membranes by multi-step coating methods and the TFC membranes produced by this method. More particularly, the method of the present invention relates to the use of a ring-opening polymerization reaction of epoxide monomers for making multiple polymer coatings on a porous support membrane. The resulting poly(epoxy)ether TFC membranes are stable in various challenging conditions of extreme pH, in harsh oxidizing environments and in highly demanding aprotic solvents, while maintaining rejection of mono- and divalent salts [Murari et al. (1983) *Membr. Sci.* 16, 121-135].

Alternatively, a porous support membrane for use in the method according to the present invention can be prepared as follows: once the desired polymer casting solution is prepared (i.e. polymers are dissolved in a suitable solvent system, and optionally organic or inorganic matrices are added into the casting solution so that the matrices are well dispersed) and, optionally, filtered by any of the known processes (e.g. pressure filtration through microporous filters, or by centrifugation), it is casted onto a suitable porous substrate, such as glass, metal, paper, plastic, etc., from which it may then be removed. Preferably, the desired polymer casting solution is casted onto a suitable porous substrate from which the membrane is not removed. Such porous substrate can take the form of an inert porous material which does not hinder the passage of permeate through the membrane and does not react with the membrane material, the casting solution, the gelation bath solvent, or the solvents which the membrane will be permeating in use.

Such porous substrates may be non-woven, or woven, including cellulosics (paper), polyethylene, polypropylene, nylon, vinyl chloride homo- and co-polymers, polystyrene, polyesters such as polyethylene terephthalate, polyvinylidene fluoride, polytetrafluoroethylene, polysulfones, polyether sulfones, poly-ether ketones (PEEK), polyphenylene oxide, polyphenyline sulphide (PPS), Ethylene-(R) ChloroTriFluoroEthylene (Halar® ECTFE), glass fibers, metal mesh, sintered metal, porous ceramic, sintered glass, porous carbon or carbon fibre material, graphite, inorganic membranes based on alumina and/or silica (possibly coated with zirconium and/or other oxides). The membrane may otherwise be formed as a hollow fiber or tubelet, not requiring a support for practical use; or the support may be of such shape, and the membrane is casted internally thereon.

Conditioning

Optionally, the porous support membrane is impregnated with a first conditioning agent dissolved in a solvent to impregnate the porous support membrane prior to the IFIP reaction. The term "conditioning agent" is used herein to refer to any agent which, when impregnated into the support membrane prior to the IFIP reaction, provides a resulting membrane with a higher rate of flux after drying. This conditioning agent may be, but is not limited to, a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof.

Following treatment with the conditioning agent, the support membrane is typically dried in air at ambient conditions to remove residual solvent.

Initiators

The term "initiator" referrers to nucleophilic compounds and encompasses any compound able to open an epoxide ring without protonating the formed zwitterion, or to induce the formation of an anion (e.g. alkoxide, hydroxide), which is able to subsequently open the epoxide ring. The initiator might be incorporated in the polymer backbone of the thin film top layer, either at the end of the polymer chain or inside the polymer network if a di-(or multi) functional initiator is used (if reaction path 1a is followed).

For the purpose of this invention, initiator encompasses any compound which react in a manner analogous to the tertiary amines in the polymerization reactions described herein. Initiator functional groups include but are not restricted to tertiary amino, tertiary thiol, bases, hydroxyl groups, such as NaOH, and other, preferentially tertiary, nucleophiles.

The ring-opening polymerization as used herein refers to the formation of a poly(epoxy)ether formed from a the opening of an epoxide-ring. The epoxide ring needs to be opened by an initiator in order for the polymerization to start. Amongst different initiators, tertiary amines are the most widely studied, and a reaction mechanism is depicted in Scheme 1. Two types of initiation steps are shown, wherein the first initiation reaction consists of the direct attack of the tertiary amine to the epoxy group resulting in a zwitterion (reaction 1a). The second initiation reaction uses the presence of alcohols or other proton-donating (acids) compounds to obtain a highly reactive alkoxide ion (reaction 1b). Caustic compounds also induce this reaction. The solvent in which the initiator is dissolved needs to ensure alkoxide formation. Propagation can be conducted through the nucleophilic attack of the alkoxide ions on the epoxy groups. The polymer will grow via chain-growth polymerization. Once all available epoxy groups are polymerized, termination will occur, wherein the solvent will again form alkoxides.

Scheme 1.

(1a)

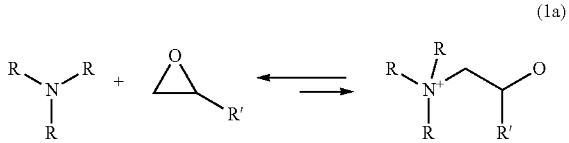

(1b)

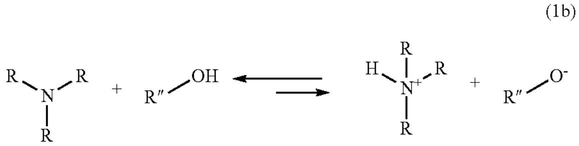

-continued (2)

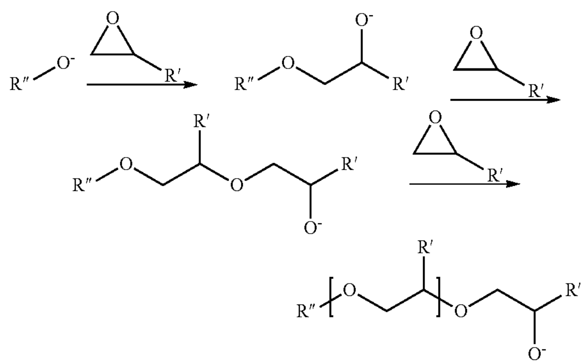

(3)

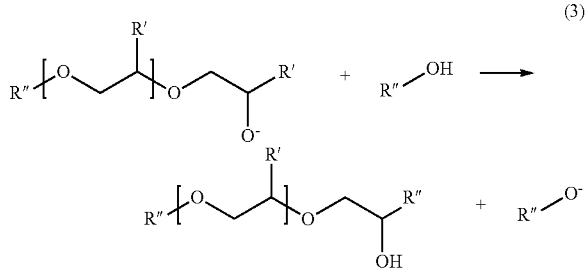

As example, initiators having amino groups as the functional group include, but are not limited to: (a) linear tertiary amines, such as N,N,N',N'-tetramethyl-1,6-hexanediamine and triethylamine; (b) cycloaliphatic tertiary amines, such as 1,4-dimethylpiperazine; (c) aromatic tertiary amines, such as (dimethylaminomethyl)phenol, 2,4,6-Tris(dimethylaminomethyl)phenol and dimethylbenzylamine; (d) pyridines, preferentially with tertiary amines, such as 4(dimethylamino)pyridine; (e) imidazoles, preferentially with tertiary amines, such as 1-Benzyl-2-methyl-1H-imidazol; (f) ammonium salts of the amines described hereinabove (a) to (e).

Preferably, said initiator contains a functional group selected from the group consisting of: a tertiary amino, a tertiary thiol, a base, a hydroxyl group and any other (tertiary) nucleophiles.

In a specific embodiment of the present invention, the initiator functional group is a tertiary amine.

Aliphatic initiators include both straight chain and branched hydrocarbons containing 2-15 carbon atoms, with at least one initiator functional group that is sufficient nucleophile and/or basic to initiate the polymerization reaction. Determination of the number and size of branches or substitutions is intended to allow high flexibility and hence higher availability of the initiator at the interface, which is also achievable by a high solubility of the initiator in the organic solvent. Initiators which are larger, more polar, more hydrophilic, or a combination thereof are expected to diffuse more slowly into the organic solvent phase and hence decrease the rate of success for initiation. Sterically hindered amines, or a branched structure with substituents on the amino groups very close together should be avoided as initiators.

It is further preferred that, the initiator concentrations are in the range of 0.05-20% by weight. The concentration of the initiator in the aqueous solution is determined, in part, upon the number and nucleophilic strength of the reactive groups per initiator molecule, the method of transferring the initiator to the porous support membrane, and the desired performance characteristics. The pH of the solution should be in the range of from about 7 to about 12. This substantially aqueous solution may or may not contain a solvent capable of dissolving or plasticizing the porous support membrane. U.S. Pat. No. 4,950,404 discloses an enhancement of flux when dissolving or plasticizing solvents such as the polar aprotic tetrahydrofuran, dimethylformamide, N-methylpyrrolidone, acetone and sulfolane are used in concentrations of about 1-20% in the aqueous initiator solution.

Epoxide Monomers

The term "epoxide monomer" refers to compounds having at least two or more oxirane rings, highly reactive due to their high ring strain (20 kcal/mol). Due to the electrophilic character of the oxygen atom in the ring, epoxides can react with nucleophiles, which open up the oxirane ring.

A general structure for the epoxide monomer can be portrayed as follows by formula (II):

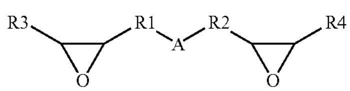

(II)

wherein A represents an aliphatic, heterocyclic, or aromatic group, i.e. a group having 2 to 8 carbon atoms, including a divalent alicyclic group, a divalent aromatic group, or a divalent hetero-aromatic group;

where $R_1$ and $R_2$ are each an independently selected alkylene or alkenylene group having from 0 to 8 carbons atoms; and wherein $R_3$ and $R_4$ are independently selected from the group consisting of: hydrogen; halogen; aliphatic, heterocyclic, or aromatic group, i.e. a group having from 2 to 8 carbon atoms, including a divalent alicyclic group, a divalent aromatic group, or a divalent hetero-aromatic group. In addition, $R_1$ and $R_3$, for example, may be taken together to be a heterocyclic or alicyclic group. In addition, $R_2$ and $R_4$, for example, may be taken together to be a heterocyclic or alicyclic group.

Preferably, the epoxide monomer is selected from the group: phenyl glycidyl ethers, bisphenol-A-diglycidyl-ether, Tetraphenolethane tetraglycidylether, neopentylglycol diglycidylether, trimetylolpropane triglycidylether, 1,4-butanediol diglycidylether, triglycidyl-p-aminophenol, tetraglycidyl-4,4'-diaminodiphenylmethane, and diglycidyl ester of hexahydrophthalic acid.

It is further preferred that, the solvent for the epoxide reagents is a relative non-solvent for the reaction product, or oligomer, and is relatively immiscible in the solvent containing the initiator. In a preferred embodiment of the present invention, threshold of immiscibility is as follows: an organic solvent should be soluble in the initiating solvent not more than between 0.01 weight percent and 1.0 weight percent. Suitable organic solvents for the epoxide include but are not limited to hydrocarbons and halogenated hydrocarbons such as n-pentane, n-hexane, octane, cyclohexane, toluene, naphtha, and carbon tetrachloride.

Poly(Epoxy)Ether

The term "poly(epoxy)ether" as used herein refers to polymers wherein the main polymer chain fully consists of C—C and C—O—C(ether) bonds and to polymers wherein the main polymer chain mainly consists of C—C and C—O—C(ether) bonds and wherein hydroxyl groups and unreacted epoxides remain present. The presence of quaternary amine groups, in case a tertiary amine was used as initiator, is possible.

Interfacial Initiation

As used herein, the term "interfacial initiation" refers to an epoxy ring-opening reaction that occurs at or near the interfacial boundary of two largely immiscible solutions, matching the surface of a porous supporting ultrafiltration membrane. The initiator is present in a phase in which the epoxide-phase is not miscible.

The interfacial initiation reaction is generally held to take place at the interface between an initiating solution, and a polyfunctional epoxide monomer solution, which form two phases. Each phase may include a solution of a single type of dissolved polyfunctional epoxide/initiator or a combination of different types of polyfunctional epoxide/initiator. Concentrations of the dissolved epoxide and initiator may vary. Variables in the system may include, but are not limited to, the nature of the solvents (including ionic liquids), the nature and functionality of the epoxide and initiator, the molar ratio between initiator and epoxide, use of additives in any of the phases, reaction temperature (thermal cycle) that affects the relative rates of different steps and reaction time. Such variables may be controlled to define the properties of the membrane, e.g., membrane selectivity, flux, top layer thickness. The interfacial initiation reaction provides a polymer film on a surface of the porous support membrane.

Densifying the Resulting Asymmetric TFC Membrane with Multiple Polymerization Steps.

Optionally, the film resulting from the IFIP is subsequently coated with an epoxide and initiating solution. The epoxide solution will impregnate in the already existing top-layer, possibly reacting with reactive groups and thus densifying it. The initiator solution, which is subsequently applied, will react with so-far unreacted epoxide groups. This might densify the polymer matrix and possibly also introduces charges in it. When the last coating step contains the initiating solution, charges are also introduced on the membrane surface. The treatment of the composite membrane with the monomer and initiating solution provides a membrane with improved properties, including, but not limited to, salt rejection and mixed salt selectivity. An improved solute retention resulting from additional polymerization steps may be demonstrated via nanofiltration or reverse osmosis experiments in an apparatus designed for either crossflow or dead-end filtration using, for example, NaCl as solute. Comparing the solute retention performance of multiple membranes should be done by comparing the solute flux across the membrane when the solvent flux is maintained as constant for multiple membranes.

'solute flux' is typically expressed as moles of solute per $m^2$ of membrane per hour. I.e., mol/(m/\2*h) or alternatively, g/(m/\2*h).

A variety of monomers and solvents may be chosen to perform the polymerization process comprising a monomer impregnated in a polymer film to yield a top-layer with improved properties. The selection of suitable candidate materials may first depend on monomer reactivity. Namely, a given pair of monomers, or optionally monomer and initiator, should cause a chemical reaction when combined, or optionally react with the already formed membrane top-layer. Additionally, the monomer which is first exposed to the membrane top-layer must be able to impregnate within it, so as to react inside the polymer film to densify it or otherwise incorporate charges within it. A monomer can be considered suitable for impregnation if it has a small size or high affinity for the top-layer polymer which enables it to partition and diffuse into the free volume elements of the membrane. Monomer size can be estimated, for example, by properties such as its Stokes radius which provides a general approximation for the size of a molecule in a given solvent. A monomer which possesses a size smaller than that of the polymer film free volume elements, typically measured via methods such as, but not limited to, positron annihilation lifetime spectroscopy (PALS), can be considered a possible candidate for monomer impregnation. Further, polymer film free volume elements may possess a distribution of sizes. Thus, although a given monomer may be larger than the average free volume element of a polymer film, it is possible for a quantity of monomer to impregnate the film, thereby enabling subsequent polymerization to possibly yield film densification. The impregnation of large monomers is influenced largely by the affinity of the monomer and solvent for the polymer film.

Should a given monomer have a large size that hinders impregnation in the polymer film, the solvent may be chosen to cause the polymer film to swell, thus increasing the available free volume of the film. A solvent has an increased likelihood to swell a polymer if it has a high affinity for it, which may be estimated via contact angle measurements. Namely, a solvent with a contact angle on the polymer film lower than 90° can be considered to wet the polymer when in contact with it, with the potential to swell the polymer film and enhance monomer impregnation.

Combinations of monomer and solvent with the potential to densify a membrane film following polymerization can be screened in a high-throughput context using a variety of methods, two of which are explained here. One example comprises the pairing of potential monomers and solvents in glass vials and allowing an excess of time (24 hours, for example) to react. Combinations of monomers and solvents which may cause a polymerization reaction can be identified as those which form a solid polymer phase in the glass vial after reaction. Another such method could involve the use of an interfacial polymerization frame which partitions the membrane surface into different regions. Each region of the membrane can be exposed to different monomer and solvent solutions, and later experimentally tested individually, to provide a rapid screening of the effect of different monomers and solvents to densify the membrane through impregnation and subsequent polymerization.

Treating the Resulting Asymmetric TFC Membrane with an Activating Solvent.

In the method according to the present invention, the post-treatment step (f) preferably includes treating the resulting TFC membranes prior to use for (nano)filtration with an activating solvent, including, but not limited to, polar aprotic solvents. In particular, activating solvents include DMAc, NMP, DMF, toluene and DMSO. The "activating solvent" as referred to herein is a liquid that enhances the TFC membrane flux after treatment. The choice of activating solvent depends on the top layer and membrane support stability. Contacting may be effected through any practical means, including passing the TFC membrane through a bath of the activating solvent, or filtering the activating solvent through the composite membrane.

More preferably, the composite membrane may be treated with an activating solvent during or after interfacial polymerization. Without wishing to be bound by any particular theory, the use of an activating solvent to treat the membrane is believed to flush out any debris and unreacted material from the pores of the membrane following the interfacial polymerization reaction or to rearrange polymer chains inside the support or top layer. The treatment of the composite membrane with an activating solvent provides a membrane with improved properties, including, but not limited to, membrane flux.

TFC-Conditioning

In an embodiment of the present invention, the resulting TFC membrane is impregnated with a second conditioning agent dissolved in a water or organic solvent to impregnate the support membrane after the interfacial polymerization reaction and optionally, the coating steps (steps (a)-(d)). The term "conditioning agent" is used herein to refer to any agent which, when impregnated into the support membrane after the interfacial polymerization reaction, provides a resulting membrane with a higher rate of flux after drying.

The "first conditioning agent" and "second conditioning agent" as referred to herein may be the same, or a different agent. This second conditioning agent may therefore also be, but is not limited to, a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof.

Following treatment with the conditioning agent, the TFC membrane is typically dried in air at ambient conditions to remove residual solvent.

A second aspect of the present invention relates to the use of the TFC membranes of the present invention, for nanofiltration or reverse osmosis of components. Said components can be suspended in organic solvents or in aqueous solvents of any pH (pH0-14) including in extreme pH conditions, such as pH (0-4), and pH (10-14) or said components can be suspended in aqueous oxidizing solvents, such as NaOCl, or said components can be suspended in polar aprotic solvents. The TFC membranes related to the present invention can also be used to selectively filter out on salt over the other.

A third aspect of the present invention relates to the TFC membranes obtainable by the methods of the present invention. Said TFC membranes comprise a poly(epoxy)ether top layer made via interfacial initiation of polymerization (IFIP) and subsequent coatings, comprising the following steps: (a) impregnation of the porous support membrane with an aqueous solution containing an initiator; (b) contacting the impregnated support membrane with a second substantially water-immiscible solvent containing a polyfunctional epoxide monomer, causing polymerization via a chemical reaction at the interface, called ring-opening of epoxides; (c) optionally re-contacting the membrane top-layer with a second substantially water-immiscible solvent containing a polyfunctional epoxide monomer; (d) re-contacting the membrane top-layer with a second an aqueous solution containing an initiator; (e) optionally, repeating steps (c) and (d).

Thus the TFC membranes of the present invention are high flux semipermeable and can be used for (nano)filtration operations, particularly in organic solvents, and more particularly (nano)filtration operations in polar aprotic solvents or in challenging pH and/or oxidizing solutions.

EXAMPLES

Example 1. Preparation of a Polymide Top Layer

A 14 wt % PI (polyimide) solution in NMP/THF 3/1 was prepared. The solution was cast onto a porous non-woven PP/PE substrate (Novatex 2471, Freudenberg). The obtained support membranes with PP/EE and PI were immersed in a 1 w/v % hexanediamine (HDA) in water solution for 1 h. After the local cross-linking reaction, the remaining HDA was allowed to diffuse out of the membrane pores by immersion of the membrane in distilled water for 5 h. The membrane was subsequently transferred to an 1 w/v % N,N,N',N'-tetramethyl-1,6-hexanediamine initiator in water solution for 1 h. A 0.1 w/v % EPON 1031™ solution in toluene was poured on the impregnated support and allowed to stand for different polymerization times. The membrane was subsequently filtered with a 35 μM rose bengal in ethanol solution, of which the results are summarized in Table 1.

TABLE 1

| Membrane (on cross linked - PI support) | Polymerization time | Permeation ($L/m^2 \cdot bar \cdot h$) | Rejection of rose bengal (%) |
|---|---|---|---|
| 0.1 w/v % EPON 1031 ™ - 1 w/v % TMHD | 20 sec | 1.95 | 95.9 |
| | 1.5 min | 1.77 | 90 |
| | 3 min | 1.53 | 95 |
| | 5 min | 2.3 | 97.1 |
| | 6 h | 1.9 | 97.5 |
| | 18 h | 2 | 96.8 |
| | 90 h | 1.8 | 90 |
| | 180 h | 1.7 | 96 |
| | 360 h | 1.8 | 98 |

Example 2. Filtration Properties of Membranes with One Layer

The support as synthesized in Example 1 is immersed in an NaOH solution of different pH for 1 h. Then, a 1 w/v % EPON 1031™ solution in toluene was poured on the impregnated support for 1 h, after which is was rinsed with toluene. The membrane was subsequently filtered with a 35 μM rose Bengal (RB) in water solution, of which the results are summarized in Table 2.

TABLE 2

| Membrane (on XL-PI support) | Water Permeation ($L/m^2 \cdot bar \cdot h$) | RB Rejection (%) |
|---|---|---|
| pH 12.05 - 1 w/v % EPON 1031 ™ in toluene | 21 | 90 |
| pH 11.88 - 1 w/v % EPON 1031 ™ in toluene | 23 | 92 |

Example 3. Application of Second Layer

A PAN support was transferred to an 1 w/v % N,N,N',N'-tetramethyl-1,6-hexanediamine in water solution for 1 h. Then, a 1 w/v % EPON 1031™ solution in toluene was poured on the impregnated support for 1 h, after which is was rinsed with toluene. This poly(epoxyether) TFC-membrane is denoted 51. To achieve a so-called S2 membrane, a 1.5 w/v % EPON 1031™ in toluene solution is poured on top of the 51 membrane and allowed to react for 1 h, after which it is discarded. A 1 w/v % aqueous TMHD solution is added for 1 h, after which the membrane is rinsed, first with water and then with toluene. To obtain a so-called S3 membrane, these steps are repeated once more. A schematic of this procedure can be found in FIG. 1. The membranes are subsequently filtered with a 5 mM NaCl in water solution, of which the results are summarized in table 2.

TABLE 3

| Membrane (on PAN support) | Water Permeation ($L/m^2 \cdot bar \cdot h$) | NaCl Rejection (%) |
|---|---|---|
| S1 | 2.4 | 22 |
| S2 | 1.9 | 55 |
| S3 | 1.8 | 75 |

Example 4. Filtration Properties of Membranes with Multiple Layers

Figure 2:
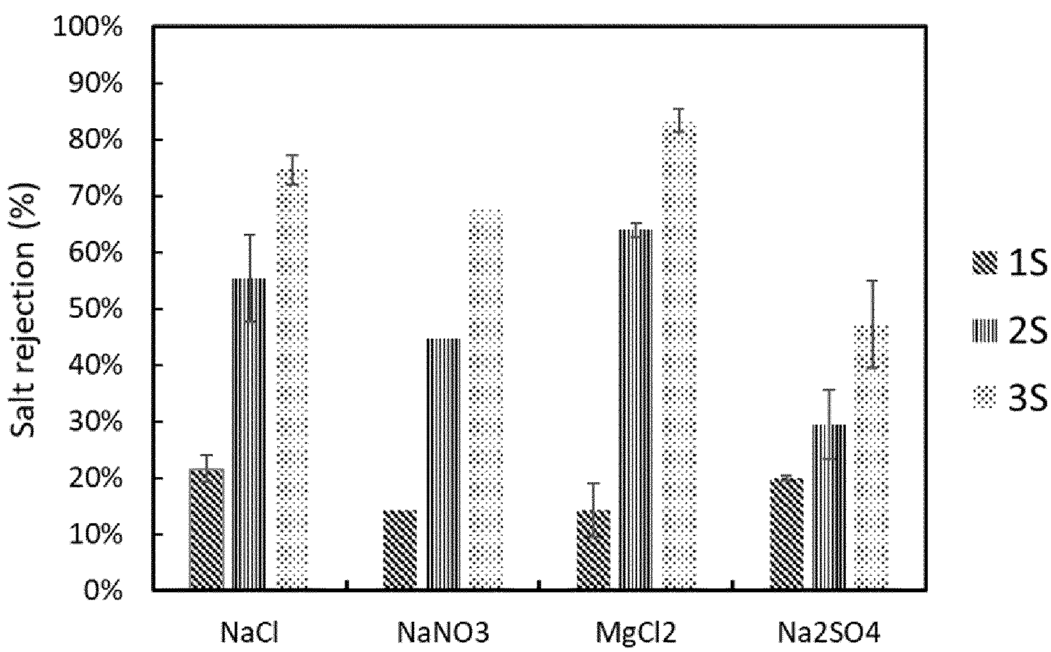
FIG. 2: Rejection of different salts of epoxy-based membranes, synthesized with different layers (1 S, 2 S and 3 S).
Figure 3:
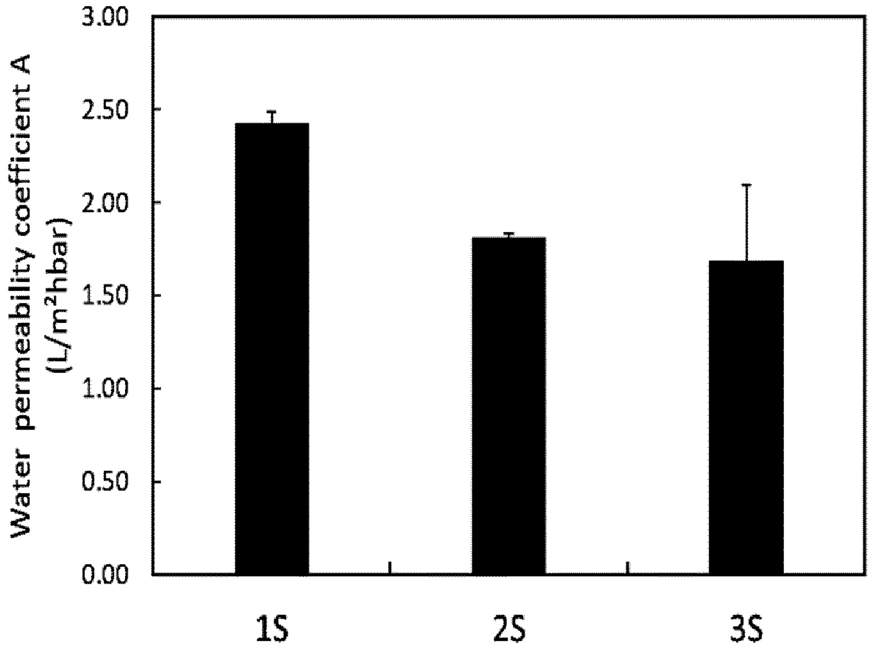
FIG. 3: Water permeability coefficient A of epoxy-based membranes, synthesized with different layers (1 S, 2 S and 3 S).

The membranes S1, S2 and S3 synthesized in Example 2 were tested with different salt solutions. The results are shown in FIG. 2. The water permeability coefficient A of these membranes is shown in FIG. 3.

Figure 4:
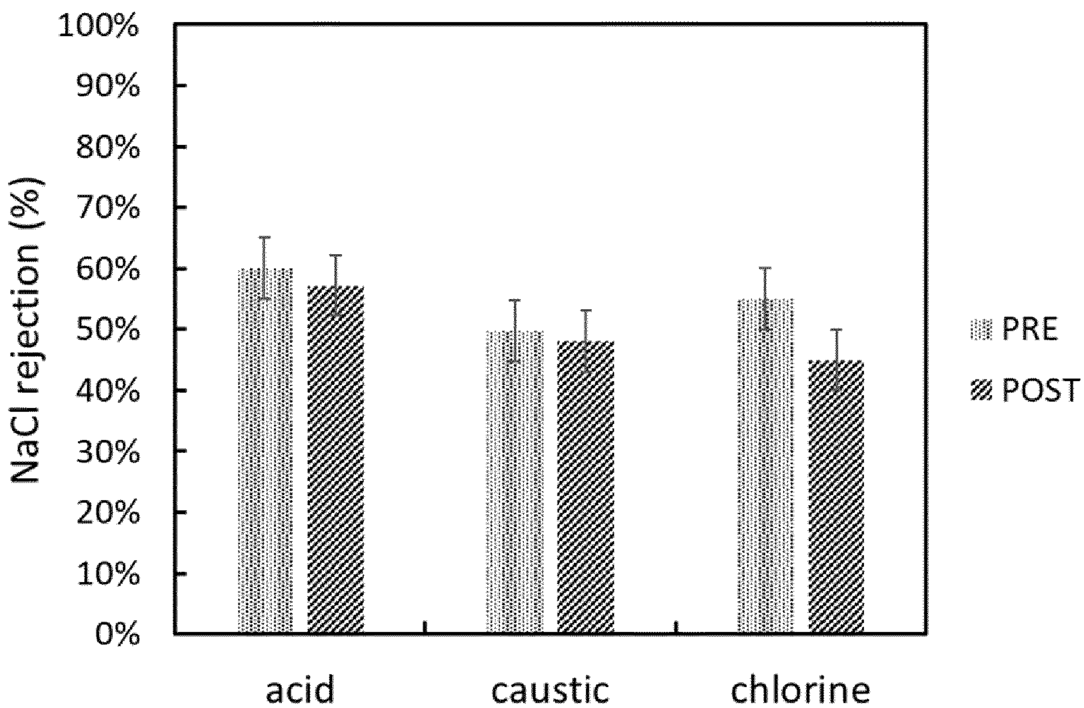
FIG. 4: NaCl rejection for an epoxy-based membranes before and after contact with an acid ($HNO_3$, pH 3), a caustic (NaOH, pH 10) and oxidizing solution (chlorine, NaOCl, 500 ppm) for 15 h.

Example 5. Filtration Properties of Membranes with Multiple Layers in Harsh Conditions The membrane S2 synthesized in Example 2 were contacted with an acid ($HNO_3$, pH 3), a caustic (NaOH, pH 10) and oxidizing solution (chlorine, NaOCl, 500 ppm) for 15 h. The poly(epoxyether) top-layer on PAN support led to stability of the full TFC-membrane in all these conditions. This is proven by similar NaCl rejections before and after treatment, as shown in FIG. 4.

Figure 5:
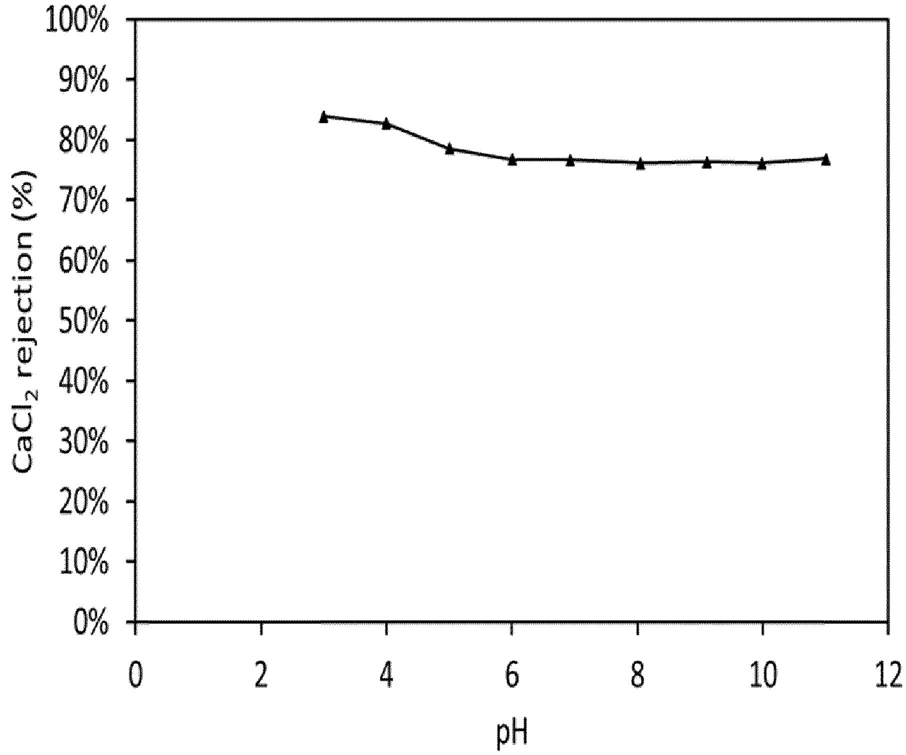
FIG. 5: Stable $CaCl_2$ rejection of an epoxy-based membrane as a function of feed pH. The pH range was limited from pH 3-10 because of the support membrane (PAN).

Example 6. Filtration Properties of Membranes with Multiple Layers at Extreme pH Values The membrane S3 synthesized in example 3 was filtered with $CaCl_2$) over a pH-range of 3-11 bar and demonstrates stable rejection. The results are shown in FIG. 5.

Example 7

The membranes S1, S2 and S3 synthesized in Example 2 were tested with different mixed salt solutions, with a total concentration of 5 mM. The anion selectivity (i.e. ratio of rejection of one anion over rejection of other anion) of each membrane is shown in Table 3.

TABLE 4

| Membrane (on PAN support) | $Cl^-/SO_4^{2-}$ | $Cl^-/NO_3^-$ | $Cl^-/H_2PO_4^-$ |
|---|---|---|---|
| S1 | 0 | 1.95 | 0.55 |
| S2 | 0.55 | 1.27 | 0.29 |
| S3 | 0.68 | 1.28 | 0.96 |

Example 8

The membranes S1, S2 and S3 synthesized in Example 3 were characterized via positron annihilation lifetime spectroscopy (PALS) to measure the size of free volume elements in the membrane selective layer. The selective layer free volume element size is shown in Table 5. Free volume element size decreases with repeated modification treatments due to enhanced selective layer crosslinking and densification.

TABLE 5

| Membrane (on PAN support) | Selective layer free volume element diameter (Å) |
|---|---|
| S1 | 5.88 |
| S2 | 5.26 |
| S3 | 4.99 |

Example 9

The membranes S1, S2 and S3 synthesized in Example 3 were characterized via x-ray photoelectron spectroscopy (XPS) to quantify the atomic percentage of quaternary ammonium groups. These functional groups contribute to a high number of fixed positive charges in the membrane, increasing rejection of charged solutes. The quaternary ammonium atomic percentage is shown in Table 6. These results demonstrate that the modification protocol described in Example 3 yields a membrane selective layer with different physicochemical properties, enhancing separation performance.

TABLE 6

| Membrane (on PAN support) | Quaternary ammonium content (atomic %) |
|---|---|
| S1 | 0.25 |
| S2 | 1.52 |
| S3 | 1.36 |

Example 10. Selective Layer Synthesis with Different Polyfunctional Epoxide Monomers Except that different polyfunctional epoxide monomers were used instead of tetraphenolethane tetraglycidylether (EPON 1031™), the same method as in Example 3 was used to synthesize membrane selective layers. Alternative monomers include: tris(4-hydroxyphenyl) methane triglycidyl ether (TRIS), bisphenol A diglycidylether (BADGE), 1,3-bis (2,3-epoxypropoxy) benzene (RDGE), and pentaerythritol glycidyl ether (GE40). The permeability and separation performance of these membranes is shown in Table 7 where membranes were filtered with a 5 mM NaCl in water solution. These results demonstrate that the permeability and selectivity performance of membranes synthesized by this method can be tuned for various applications.

TABLE 7

| Membrane and monomer (on PAN support) | Water Permeation ($L/m^2 \cdot bar \cdot h$) | NaCl Rejection (%) |
|---|---|---|
| S2 EPON 1031 ™ | 1.20 | 86 |
| S2 TRIS | 1.90 | 83 |
| S2 BADGE | 2.09 | 56 |
| S2 RDGE | 3.16 | 68 |
| S2 GE40 | 1.13 | 61 |

The invention claimed is:

1. A method for synthesizing a thin-film composite membrane, the method comprising a first cycle of (a), (b), (c), (d), and (e):

(a) providing an ultrafiltration porous support membrane having an outer surface coated with a thin film and synthesized through interfacial polymerization or interfacial initiation of polymerization;

(b) contacting the ultrafiltration porous support membrane with a first solution comprising a first monomer, and allowing the first solution to impregnate inside the thin film of the ultrafiltration porous support membrane;

(c) discarding the first solution;

(d) contacting the ultrafiltration porous support membrane with a second solution comprising a second monomer, and allowing the second solution to impregnate inside the thin film, whereby the second monomer reacts with the first monomer and optionally with reactive groups of the thin film; and (e) discarding the second solution, and repeating at least one additional cycle of (b), (c), (d), and (e), wherein in the at least one additional cycle of (b), (c), (d), and (e), monomer order of the first monomer and the second monomer in (b) and (d) is switched.

2. The method according to claim 1, wherein the first monomer and/or the second monomer in the at least one additional cycles are different from the first monomer and/or the second monomer in the first cycle.

3. The method according to claim 1, wherein the first monomer and the second monomer in the first cycle and each of the at least one additional cycle are identical.

4. The method according to claim 1, further comprising repeating (b) to (e) in a consecutive cycle after the first cycle, wherein the first solution in the consecutive cycle comprises the second monomer of the first cycle and the second solution in the consecutive cycle comprises the first monomer of the first cycle.

5. The method according to claim 1, wherein the first monomer or the second monomer contains a functional group selected from the group consisting of an acid halide, a diamine, a triamine, a polyamine, an isocyanate, a polyol, a monocarboxylic acid, a dicarboxylic acid, and a functionalized triazine.

6. The method according to claim 1, wherein the first monomer or the second monomer contains a functional group selected from the group consisting of a tertiary amino, a tertiary thiol, a base, and a hydroxyl group.

7. The method according to claim 1, wherein:

the first monomer is a nucleophilic monomer; and the second monomer is a polyfunctional epoxide monomer.

8. The method according to claim 1, wherein the second solution is a solvent or ionic liquid that is immiscible with the first solution.

9. The method according to claim 7, wherein the polyfunctional epoxide monomer is selected from the group consisting a phenyl glycidyl ether, bisphenol-A-diglycidylether, tetraphenolethane tetraglycidylether, neopentylglycol diglycidylether, trimethylolpropane triglycidylether, 1,4-butanediol diglycidylether, triglycidyl-p-aminophenol, tetraglycidyl-4,4'-diaminodiphenylmethane, and diglycidyl ester of hexahydrophthalic acid.

10. The method according to claim 1, wherein the porous support membrane has a thickness from 0.1 μm to 500 μm.

11. The method according to claim 1, further comprising repeating (b), (c), (d), and (e) until a top layer is obtained with a thickness greater than 100 μm and pores having pore sizes less than 15 nm.

12. A method for nanofiltration or reverse osmosis of components, the method comprising filtering a solution over a thin-film composite membrane obtained by the method of claim 1.

13. The method according to claim 12, wherein the components are suspended in an organic solvent, in a combination of organic solvent and water, or in a polar aprotic solvent.

14. The method according to claim 12, wherein the components are suspended in an aqueous solvent having a pH from 0 to 4 or from 10 to 14.

15. The method according to claim 12, wherein the components are suspended in an aqueous oxidizing solvent.

16. The method according to claim 12, wherein the components are suspended in NaOCl.

* * * * *